United States Patent
Konze et al.

(10) Patent No.: US 10,569,918 B2
(45) Date of Patent: Feb. 25, 2020

(54) METHOD FOR CONTROLLING A PACKAGING MACHINE AND A PACKAGING MACHINE

(71) Applicant: SIG Technology AG, Neuhausen am Rheinfall (CH)

(72) Inventors: Sabine Konze, Linnich (DE); Peter Theissen, Waldfeucht (DE); Lukas Merten, Korschenbroich (DE)

(73) Assignee: SIG Technology AG, Neuhausen am Rheinfall (CH)

(*) Notice: Subject to any disclaimer, the term of this patent is extended or adjusted under 35 U.S.C. 154(b) by 360 days.

(21) Appl. No.: 15/107,336

(22) PCT Filed: Jan. 8, 2015

(86) PCT No.: PCT/EP2015/050194
§ 371 (c)(1),
(2) Date: Jun. 22, 2016

(87) PCT Pub. No.: WO2015/110288
PCT Pub. Date: Jul. 30, 2015

(65) Prior Publication Data
US 2017/0001744 A1    Jan. 5, 2017

(30) Foreign Application Priority Data
Jan. 23, 2014    (DE) .......................... 10 2014 000 701

(51) Int. Cl.
*B65B 57/00*    (2006.01)
*B65B 55/02*    (2006.01)
(Continued)

(52) U.S. Cl.
CPC ................ *B65B 57/00* (2013.01); *B65B 1/06* (2013.01); *B65B 1/40* (2013.01); *B65B 55/02* (2013.01);
(Continued)

(58) Field of Classification Search
None
See application file for complete search history.

(56) References Cited

U.S. PATENT DOCUMENTS 5,050,088 A * 9/1991 Buckler ........... G05B 19/41835
700/96
5,369,570 A * 11/1994 Parad ..................... G06Q 10/06
700/99
(Continued)

FOREIGN PATENT DOCUMENTS

CN    103057738 A    4/2013
DE    102008033549 A1    2/2009
(Continued)

*Primary Examiner* — Jason Lin
(74) *Attorney, Agent, or Firm* — The Webb Law Firm

(57) ABSTRACT

A method for controlling a packaging machine in which at least two operating states of the packaging machine are defined and independent from one another. At least one of a plurality of defined process sequences is allocated to each of the operating states and at least one actuator of the packaging machine is actuated by a process sequence, in order to carry out at least one action. Improved control and maintenance of the machine is made possible by an authorisation for access to an actuator being exclusively and specifically allocated to only one process sequence depending on the operating state.

15 Claims, 3 Drawing Sheets

(51) Int. Cl.
  *B65B 1/40* (2006.01)
  *B65B 59/00* (2006.01)
  *B65B 1/06* (2006.01)
  *G05B 19/418* (2006.01)
  *G06Q 50/04* (2012.01)
  *G06Q 50/28* (2012.01)
  *G05B 19/042* (2006.01)
  *B65B 7/20* (2006.01)

(52) U.S. Cl.
  CPC ............ *B65B 55/025* (2013.01); *B65B 59/00* (2013.01); *G05B 19/042* (2013.01); *G05B 19/4184* (2013.01); *G05B 19/41865* (2013.01); *G06Q 50/04* (2013.01); *G06Q 50/28* (2013.01); *B65B 7/20* (2013.01); *G05B 2219/31192* (2013.01); *G05B 2219/45226* (2013.01); *Y02P 90/30* (2015.11)

(56) References Cited

U.S. PATENT DOCUMENTS

| | | | |
|---|---|---|---|
| 5,914,880 A * | 6/1999 | Yasojima | G06F 19/00 700/108 |
| 6,724,404 B1 * | 4/2004 | Hann, Jr. | G05B 19/4187 700/108 |
| 8,127,063 B2 | 2/2012 | Sherriff et al. | |
| 2002/0054348 A1 | 5/2002 | Ishioroshi et al. | |
| 2003/0100957 A1 * | 5/2003 | Chaffee | G05B 19/042 700/18 |
| 2006/0074697 A1 | 4/2006 | Yamaji et al. | |
| 2008/0004723 A1 * | 1/2008 | Fax | G05B 19/4184 700/51 |
| 2009/0234482 A1 * | 9/2009 | Ide | H01L 21/67276 700/100 |
| 2009/0293890 A1 | 12/2009 | Faraci et al. | |
| 2015/0057764 A1 * | 2/2015 | Gonzalez | G06F 21/44 700/9 |

FOREIGN PATENT DOCUMENTS

| | | | |
|---|---|---|---|
| DE | 102009017638 A1 | 10/2010 | |
| EP | 2103522 A2 | 9/2009 | |
| EP | 2209055 A2 | 7/2010 | |
| EP | 2578499 A1 * | 4/2013 | ............. B65B 19/28 |
| EP | 2578499 A1 | 4/2013 | |
| JP | 2002149208 A | 5/2002 | |
| JP | 201382502 A | 5/2013 | |
| WO | 2004069662 A1 | 8/2004 | |

* cited by examiner

|    | S1 | S2 | S3 | S4 |
|----|----|----|----|----|
| G1 | P1 | P1 | P2 | P0 |
| G2 | P0 | P1 | P1 | P2 |
| G3 | P0 | P0 | P0 | P3 |

Fig.2

| P1  | Z1        | Z2        |    |
|-----|-----------|-----------|----|
| P1a | $R1_{Z1}$ | $R1_{Z2}$ | T1 |
| P1b | $R2_{Z1}$ | $R3_{Z2}$ | T2 |
| P1c | $R3_{Z1}$ | $R4_{Z2}$ | T3 |

Fig.3

| Z1        | A1 | A2 | A3     |
|-----------|----|----|--------|
| $R1_{Z1}$ | 0  | 1  | Temp 1 |
| $R2_{Z1}$ | 0  | 2  | Temp 2 |
| $R3_{Z1}$ | 1  | 4  | Temp 3 |

Fig.4

METHOD FOR CONTROLLING A PACKAGING MACHINE AND A PACKAGING MACHINE

CROSS-REFERENCE TO RELATED APPLICATIONS

This application is the United States national phase of International Application No. PCT/EP2015/050194 filed Jan. 8, 2015, and claims priority to German Patent Application No. 10 2014 000 701.4 filed Jan. 23, 2014, the disclosures of which are hereby incorporated in their entirety by reference.

BACKGROUND OF THE INVENTION

Field of the Invention

The subject matter relates to a method for controlling a packaging machine and to a packaging machine. In the case of the method of the subject matter and the packaging machine of the subject matter, initially two operating states are defined. Process sequences are allocated to each of these operating states, so that depending on the operating state certain processes can be passed through. At least one actuator, which is arranged to carry out at least one action of the packaging machine, is actively triggered in each of these process sequences. That is to say, an actuator is actuated in a process sequence in such a way that it can carry out certain actions on the packaging machine.

Description of Related Art

Packaging machines, and in particular filling machines, are well-known in a wide range of largely distinct sub-types. If filling machines are generally being referred to and a product is to be filled into a container in a fluid and/or bulk state, the person skilled in the art will certainly differentiate to a great extent according to the actual physical aggregation state of the product to be filled and whether, for example, it is to be filled into plastic or glass bottles or, for instance, into cartons consisting of composite materials.

Two basic methods have established with regard to filling cartons consisting of composite materials. In the first method, the product to be filled is filled into a flexible tube formed around a filling mandrel, from which then initially individual bag-like containers are pinched and separated, which are only subsequently shaped into stabile cartons. In the second method, the product to be filled is filled into cartons already formed beforehand and only open to one side and the carton subsequently closed.

The problem when controlling packaging machines, however, is that a wide range of process sequences or the control routines associated with them can alter the state of the operating resource. Thus, a process sequence for a sterilisation process can, for example, actuate and activate a heater. If in addition, for example, a further process sequence is active which, as the case may be, also tries to actuate the heater, e.g. switch it off, the state of the heater is unknown and cannot be easily traced.

For a service technician or engineer commissioned with servicing or maintaining a filling machine, thus in the broadest sense for the operator of the packaging machine, it is not therefore evident on the basis of the process description and the program flow which state an operating resource (actuator or sensor) has at a specific point in time. Particularly, if various process sequences at the same time or randomly access one and the same operating resource, it is not possible to recognise on the basis of a description of a process sequence which state an operating resource has at a specific point in time. This is particularly a problem in the light of access to the production process and changes to process sequences, since changes to process sequences may possibly lead to unwanted results.

SUMMARY OF THE INVENTION

The subject matter was based on the object of providing a method for controlling a packaging machine and a packaging machine, in which states of operating resources can be determined at each point in time of operation on the basis of a process description.

This object is achieved with respect to the subject matter by an authorisation for access to an operating resource being exclusively specifically allocated to a process sequence depending on the operating state. Hence, it is possible on the basis of knowledge of the operating state of the machine to say which process sequence controls a respective sequence and subsequent to this it is possible, without having to evaluate the respective operating resource, to determine its state on the basis of the description of the process sequence and the current process sequence step.

A service technician or engineer maintaining the machine can consequently determine the (target) state of any operating resource at each point in time. In the case of deviations of the actual state from the target state, an error analysis can then be carried out immediately based on the distinct and immediately apparent target state circumstances.

For the purposes of this document, not only active elements (actuators), such as e.g. valves, but also sensors, for example for determining temperatures, flow rates or pressures, will be referred to as operating resources. Hence, active switching or activating a sensor is also subject to the same system as actuating actuators. A sensor temporarily activated in this way in a process sequence can then actively introduce its messages—for example an error message in the case of a limit value determined by it being exceeded—into the valid process sequence. The process sequence can, however, make provision for the sensor to be switched off again in a later step. Logical links can also be referred to as operating resource for the purposes of this document. Thus, for example, a signal exchange (import and export signals) or a function for linking certain events can be activated or switched off again. If subsequently an actuator, a sensor or a link is also only partly concerned, the described function can, where applicable, also be allocated to another operating resource.

As a result of the method of the subject matter, it is no longer necessary to check which process sequence could possibly have access to an operating resource. Even if this check were possible, in the case of a plurality of process sequences accessing an operating resource its state still could not be unambiguously determined, since it is not known which sequence step a respective process sequence has passed through at a certain point in time and which state a process sequence has and which process sequence last accessed the operating resource.

A packaging machine has, for example, the "start up", "production" and "shut down" states. In addition to these three operating states, further machine operating states can be defined according to the application. In the case of a filling machine for food products, these could, for example, be "$H_2O_2$ sterilisation" and/or also "CIP cleaning". With other machines, the "sterilisation" state, for example, can be dispensed with. It is also possible, for example, for the machine to be retooled in the "retool" state and actuators designed for this purpose must be initially brought into suitable positions for retooling the machine.

During each operating state, the machine can also take up intermediate states. In order to make higher granularity possible with regard to assigning operating resources to process sequence, it is proposed that at least one of the operating states has at least two intermediate states and that the exclusive access of a process sequence to an operating resource is dependent on the intermediate state.

As in the subject matter, an authorisation for access to an operating resource is exclusively specifically allocated to a process sequence depending on the operating state, wherein the circumstances which determine a certain operating state can be defined beforehand, for the purposes of this document such possible intermediate states are also to be referred to as an operating state.

The operating states, preferably all operating states, require certain actions from the operating resources, preferably from all operating resources, these actions being defined in the respective process sequences. Each of these operating states has at least one assigned process sequence which has exclusive access to at least one respective operating resource. For different operating resources or different groups, in an operating state in each case other process sequences can also be responsible. This means that preferably at each point in time an action is assigned to each operating resource, even if it is only a "non-operative action". The responsibility as to which process sequence has exclusively assigned the respective operating resource its current action can, however, change according to the dependencies stored in the control system of the machine, if this is permitted by the process sequences.

According to one embodiment, it is proposed that at least two operating resources depending on their respective functions within the packaging machine can be allocated to a group and that the exclusive authorisation for access to operating resources of a group can be allocated to a process sequence. It has become apparent that the complexity of the allocation of exclusive access authorisations can be considerably reduced if operating resource groups are defined. An operating resource can only be specifically allocated to one group in each case. A group can relate to a functional unit. Thus, for example, a ventilation unit can consist of a ventilator and a control valve. The control valve must be open and the ventilator switched on in order to ventilate. Hence, two operating resources must be activated, in order to make the functionality of such a unit available. The ventilator and the control valve can therefore be combined into a "ventilation unit" group.

A gassing unit can, for example, consist of a metering valve and a regulating valve, as well as temperature-monitored filters and valves. All operating resources necessary for the functionality of this device can then be combined in one respective group. When the machine is in operation, one or more process sequences can be defined for each operating state, these process sequences having an exclusive authorisation for access in each case to an operating resource and/or to one of the groups and hence to all operating resources belonging to the group. No other process sequence is allowed to access the operating resource of the respective group for this operating state. A distinct process sequence can be responsible for each group in each case, so that in an operating state different process sequence can also be allocated to different operating resources and/or groups.

During a process sequence, it is necessary to define which steps a machine is to carry out. That includes e.g. adjusting and setting actuators, for example opening and closing a valve or heating a heater to a specific temperature. Activating a ventilator or a pump can also be classified as setting an actuator. It is proposed that only the exclusively access-authorised process sequence can alter, specifically control or regulate, a state of an operating resource. That is to say, that the state of the operating resource can only be altered, specifically controlled or regulated, by the process sequence which has the exclusive access authorisation. Hence, the state of an operating resource is known by checking the respectively exclusively access-authorised process sequence and where appropriate the current process sequence step. The state of an operating resource can be determined depending on this process sequence, since with respect to the subject matter no other process sequence during the defined operating state is allowed to intervene in the state of the operating resource.

The machine can change between operating states during operation. The access authorisation is with respect to the subject matter dependent on the operating state. Therefore, with each change between operating states it is necessary to check the current access authorisation for an operating resource or a group. When there is a change between operating states, the exclusive access authorisation with the previously access-authorised process sequence can remain or a change may be necessary. If a change in the access authorisation is necessary, this can be assigned to another process sequence for an operating resource or a group, respectively. Hence, it is ensured that after a change between operating states the respectively responsible process sequence has the exclusive access to the operating resource or the group.

The packaging machine of the subject matter specifically only has one operating state at each point in time. It is proposed that a packaging machine of the subject matter at one point in time cannot have two different operating states.

A process sequence can, for example, also be allocated to different operating states. Thus, for example, a steam barrier process is required both in the "production" operating state and in the "CIP cleaning" operating state. The "steam barrier" process sequence can therefore also be carried out in both operating states. Depending on which operating state the process sequence, e.g. of the steam barrier process is invoked in, its allocation to operating resources can change. Therefore, the exclusive access authorisation of a process sequence to an operating resource or a group is dependent on which operating state the process operation is carried out in. Depending on the operating state, one and the same process sequence can have a different allocation to operating resources and hence a different access authorisation.

With respect to the subject matter, at least two sub-processes can be defined in each process sequence. Each sub-process can be divided into individual process steps. Here, it is possible to allocate a time duration to each process step, which is necessary for the process step. The actions allocated to this process step are carried out on the respective operating resource within this time duration.

A group of operating resources can be combined in one group. Within this group, it is possible to set the individual operating resource so that they are coordinated with one another. It is conceivable for states of individual operating resources to only be possible if other operating resources have also obtained defined states. In this respect, within a group coordinating the states of the operating resources may be necessary. The dependencies can preferably then best be traced if all operating resources of a group with their states are maintained in a corresponding table. Each sub-process of a process sequence can then refer to one of the state combinations for the group defined in the respective table and so ensure that the dependencies of the states are always adhered to.

One dedicated access table can be defined for each group. It is also possible for a common access table to be defined for all operating resources. Access tables can also be defined for a plurality of operating resources and, in addition, access tables for groups. States can be defined within the access table. In particular, all possible (allowed) permutations or combinations of states can be defined in the access tables. A process sequence or a sub-process has the possibility of obtaining access to all operating resources of a group via the access table. Here, for each possible combination of states e.g. a single line can be defined and a process sequence or a sub-process can have a reference to a combination (e.g. the respective line) of an access table. By this means, it is ensured that only allowed states are obtained during a process sequence. In this way, the packaging machine does not get into states which are not allowed.

Thus, the program control accesses the access table, in order to control the operating resources with its contents. Therefore, the access table can ultimately also be treated as a control table.

A distinct access table can be defined for each process sequence. Clarity is thereby considerably increased. It is also in this way possible to carry out and trace later alterations more easily. In addition, on a case-by-case basis, it even makes sense for a plurality of distinct access tables to be defined for at least one process sequence. A particularly practice-oriented variant can arrange to provide an access table for the valves and a further access table for the other operating resources.

That is to say, that for a first process sequence at least one first access table is defined for a first group and for a second process operation at least one second access table is defined for the first group. The states of the operating resource for different process sequences as well as different operating states can vary, so that the access table can be defined dependent on a process sequence.

The states of at least two operating resources can by means of access descriptions be respectively described in an access table. In this way, an access description can be defined for every permissible value of a combination of states. All access descriptions can be stored in an access table. Hence, within a process sequence, a reference to one to N access table(s) and the respective access description are possible, in order to obtain an allowed combination of states. Preferably, however, the access descriptions are stored per process sequence in at least one access table, so that within the process sequence a reference to at least one access table and the respective access description is possible.

During operation, a packaging machine can, for example, run through the following operating states. Initially, the machine is in the "start up" state. In the case of a machine for food products, the packaging machine can then change to the "ready for sterilisation" state. Here, the packaging machine is prepared for the sterilisation in the aseptic unit. Subsequently, a "sterilisation" in particular of the aseptic unit can take place. After the "sterilisation" has been carried out, the machine can change to the "production" operating state. After production has finished, the "ready for cleaning" operating state can be taken and subsequently the "CIP cleaning" operating state can be taken. After "CIP cleaning", the machine can again change to the "ready for sterilisation" state or also, for example, be shut down. "Shut down" can be a distinct operating state.

In the course of the above mentioned operating states, various process sequences are possible which, for example, can also run in various operating states. The allocation to different groups can take place depending on which operating state the process sequence runs in.

The most frequent process sequence in a packaging machine for food products are "$H_2O_2$ sterilisation", "$H_2O_2$ sterilisation during production", "steam sterilisation", "production", "conveyor chain cleaning", "steam barrier" and "CIP cleaning". Other process sequences are, as already described above, also possible and may be necessary. For the sake of simplicity, however, these are not listed here.

There is a wide range of different types of operating resources inside a packaging machine. A selection of the various types includes a control valve, a heater, a servomotor, a pump, a ventilator, a flow control valve, a temperature sensor and a pneumatic drive. Other operating resources are also possible and can be actuated as and when required.

A further aspect is a packaging machine as described herein. A defined description of the state of a packaging machine at any one time is then possible if the control device exclusively only grants one of the process sequences an authorisation for access to an actuator depending on an operating state.

BRIEF DESCRIPTION OF THE DRAWINGS

The subject matter is explained in more detail below by means of the figures which show exemplary embodiments.

FIG. 2 shows an allocation of process sequences to operating states;

FIG. 3 shows an exemplary description of a process operation;

FIG. 4 shows a schematic access table with access descriptions;

DETAILED DESCRIPTION OF THE INVENTION

Figure 1:
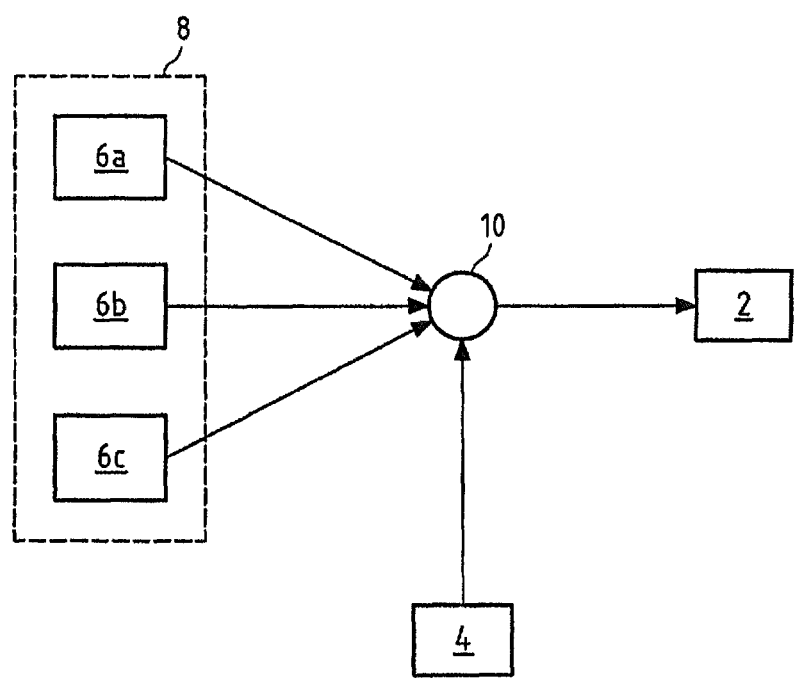
FIG. 1 shows a systematic design of an allocation between operating states and process sequences and the respective actuators.

FIG. 1 schematically shows an operating resource formed by an actuator 2. The actuator 2 can be, for example, a control valve which can take the "on" and "off" states. However, it is also possible, for example, for the actuator 2 to be a heater, in which a temperature of a medium can be set. The actuator 2 can be any operating resource required to operate a packaging machine. Only one actuator 2 is illustrated, purely by way of example, but it goes without saying that a packaging machine has a number of actuators 2 or other operating resource which all preferably, as described below, can be operated. Actuators 2 can also be combined into groups. In this case, the description of FIG. 1 also correspondingly applies for an allocation of a process sequence to a group.

In addition to the actuator 2, a plurality of sensors (not shown) can be built into a packaging machine. The sensors can detect whether the actuators have obtained certain states and report these back, in order to make a control intervention into the state of the actuator 2 possible.

FIG. 1 further shows a control device 4 which can have a CPU for example. The control device 4 controls the access of a process sequence 6a-c to one of the actuators 2. By means of the control device 4, it is possible to control an exclusive allocation between a process sequence 6a-c stored in a program memory 8 and the actuator 2. For this purpose, the current operating state of the packaging machine is always determined in the control device 4 and stored. Depending on which operating state the packaging machine is in, an exclusive allocation of one of the process sequences 6a-c to the actuator 2 is carried out by the control device 4. This allocation is schematically illustrated by the switch 10 which indicates that in each case only a one-to-one relationship can exist between an actuator 2 and one of the process sequences 6a-c.

Hence, by means of the control device 4 it is possible to always enable specifically only one of the process sequences 6a-c to alter a state of the actuator 2. With knowledge of the operating state of the packaging machine, it can now always be determined from outside the packaging machine which state an actuator 2 has, since it is always defined which of the process sequences 6a-c has exclusive access to the actuator 2. If now the allocated process sequence is analysed, which state the actuator 2 has at any point in time will result directly from this.

Within the process sequence 6a-c, it is also possible for an actuator state to change, for example after a specific period of time or through program specified settings. However, this is not critical in view of the fact that by examining the process sequence and the process time duration it can be determined which process step the process sequence is in. The state of the actuator can be determined by means of the respectively exclusive process sequence.

FIG. 2 purely schematically shows the allocation of operating states S1-S4 and groups G1-G3 to process sequence P0-P3 within a table. The groups G1-G3 are represented in lines in the table. Each line is allocated to one of the groups G1-G3. An actuator 2 can specifically be allocated to only one group G1-G3.

Different operating states S1-S4 are entered in the columns of the table according to FIG. 2. The operating state S1 can be a "start up" state for example, the operating state S2 a "sterilisation" state for example, the operating state S3 a "production" state for example and the operating state S4 the "shut down" state of the machine, for example. Each of the operating states S1-S4 can, as already explained, have sub-states or intermediate states.

At each point in time, a process sequence is allocated to each group G1-G3 and, at the same time, in each of the operating states S1-S4 specifically one of the process sequences P0-P4 is in each case allocated to a group G1-G3. A process sequence P0 can be a base process sequence, for example. This process sequence P0 can bring the operating resource into a position and/or a state in each case which is best suited for further actions. During the base process sequence P0, no production-specific process steps, for example, are run through.

In addition to the base process sequence P0, three process sequences P1-P3 can be defined for example, in which the operating resources of the groups G1-G3 are controlled, respectively. For each of the process sequences P0-P3, different process steps and/or sub-processes can be defined, as e.g. are illustrated for the process sequence P1 in FIG. 3.

It can be identified in FIG. 2 that the process sequence P1 is active for the group G1, e.g. in the case of the operating states S1 and S2. For the group G1, the process sequence P2 is active for the operating state S3 and the process sequence P0 is active for the operating state S4. It can also be identified that the process sequence P1 e.g. is also exclusively responsible for the group G2 in the operating states S2 and S3. Depending on the operating state, however, another operating mode of the actuators may be required in the groups G1 and G2 by the process sequence P1.

FIG. 3 shows a process sequence P1 with the process steps P1a-P1c. A time duration T1-T3 is allocated to each process step P1a-P1c. After a process step has been run through, a specific time duration T1-T3, e.g. expressed in milliseconds, has elapsed or this time duration T1-T3 is required. In addition, a reference R1-R4 to a state description within a state table Z1-Z2 is provided for each process step. That is to say, in the example shown, the process step P1a is defined in such a way that it has a reference R1 to the state table Z1 and a reference R1 to the state table Z2, as illustrated in FIG. 3.

As can be identified in FIG. 3, the state table Z1 is referenced via the references $R1_{Z1}$ to $R3_{Z1}$ for the process steps P1a-P1c. The state table Z2 is referenced via the references $R1_{Z2}$, $R2_{Z2}$, $R4_{Z2}$. The indices Z1 and Z2 indicate that the references R1-R4 refer to the respective state tables Z1 or Z2. It becomes clear that a different reference to a state table Z1, Z2 is possible for each process step P1a-P1c.

Within the state table Z1, states for each actuator are then defined, wherein each reference R1-R3 relates to a different state description together with actuator states, as described in FIG. 4.

The allowed/assigned permutations of actuator states of a plurality of operating resources are described in a respective state description, as illustrated in FIG. 4. It should be pointed out that the state of all operating resource does not have to be defined in a state description for each process sequence P0-P3. It should also be pointed out that combinations of states allowed by the state table can be defined. Furthermore, it may be necessary to define the states of all operating resources for at least the process sequence P0. In the other process sequence P1-P3, it is possible not to define all operating resources with their states but only those which are at least temporarily involved in the process sequence—i.e. those which at least for a period of time are allowed to "participate".

Within an access table Z1-Z2, different combinations of actuator states can be defined. This is referenced via the references R1-R4 to access descriptions within the access tables Z1.

An access table Z1 is illustrated in FIG. 4. Actuators A1-A3, for example, are defined in this table. The allowed states of the actuators A1-A3 desired in the process sequence P1 are described in the references R1-R3 in state descriptions of the state table Z1. The reference R1 defines, for example, the actuator A1 as closed, the actuator A2 as opened and the actuator A3 at temperature 1. The reference R2 defines the actuator A1 as closed, the actuator A2 in mode 2, for example in a clocked opened-closed cycle, and the actuator A3 at temperature 2. The reference R3 defines, for example, the actuator A1 as opened, the actuator A2 in mode 4 and the actuator A3 at temperature 3. As can be identified, different combinations of actuator states can be represented by different references R1-R3 in the state tables Z1, Z2.

Hence, within a state table Z1 all allowed combinations of states of the actuators A1-A3 are defined. Therefore, at each point in time it can be determined which operating state S1-S4 the packaging machine is in. Depending on the operating state S1-S4, it can then be determined which process sequence P0-P3 is responsible for the respective actuator group G1-G3.

Depending on the responsible process sequence P0-P3, intermediate steps P1a-P1c can be defined which in each case have a reference R1-R3 to access descriptions for operating resources. Each combination of allowed operating resource states is defined in the state descriptions, so that by checking the respectively referenced state description it can be identified from the process operation which target state a respective operating resource is supposed to be in.

An actuator can in each case specifically only be allocated to one group. Furthermore, in each case only one process sequence can be allocated to an operating state of a group, so that a distinct relationship between the operating state, the process sequence and the actuator exists. An actuator can only be affected by the process sequence which has the exclusive access authorisation to it.

Figure 5:
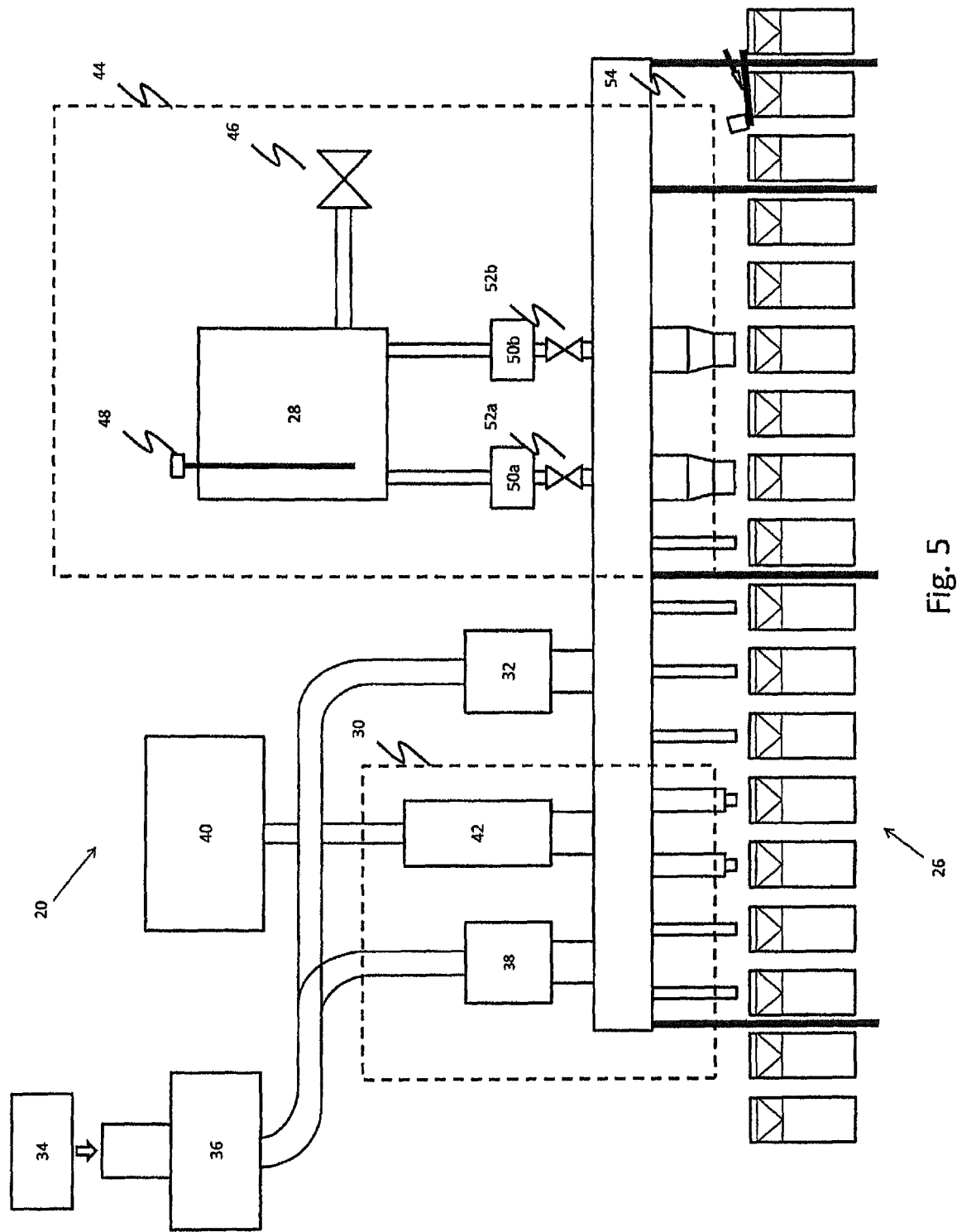
FIG. 5 shows a schematic design of a packaging machine.

The design of a filling machine is explained schematically in FIG. 5.

The filling machine 20 usually has a plurality of finishing lines which are arranged parallel to one another and at the respective entrances of which in each case a magazine is arranged which serves to receive the subsequent carton packages which are delivered still as folded boxes 24. These folded boxes 24 are still open on two sides and are firstly unfolded in the filling machine 20 and closed on one of the still open sides. Then, the cartons 24 which are still open on one side are passed on to a transport mechanism which guides the packages into a clean-room-like area 26, in which the carton package 24 is filled with the product to be filled 28 under sterile conditions. To this end, the package 24 is firstly sterilised in a steriliser 30 and then cleansed and heated with clean air introduced through a fan 32.

The steriliser can be defined as a group of actuators. Contained therein are e.g. a ventilator 34, a filter 36, a heater 32 and 38, an $H_2O_2$ metering device 40 and a heater 42.

The filling unit 44 can be made up of different actuators. These can be formed as a group. For example, an inlet valve 46, a fill level sensor 48, flow meters 50a, 50b and outlet valves 52a, 52b can be formed in this manner.

After the actual filling process, which can be carried out in one or more steps, the package is closed still in the clean-air-like area 54—the so-called "aseptic zone". Afterwards, the package gable top or the package base is also formed from the last closed side by folding over and sticking on the carton flaps created during closing and the finished carton packaging is where appropriate labelled and finally conveyed to subsequent processing steps or processing machines, such as a straw applicator or an outer packaging machine.

With this type of filling machine, usually a number of operating resources, in particular actuators and sensors, work together, in order to package the product to be packaged in a way which is reliable in terms of the process. The different operating resources of the machine must be coordinated such that e.g. in a synchronised production process each of the production units connected in series within a finishing line produces the desired result within the current operating state at each desired point in time.

In addition to the "production" operating state, which enables the process just explained to be carried out, there are various other operating states of the filling machine. Thus, in addition to particular states when the machine is started up and shut down, i.e. when it is powered up and powered down, particularly in the food processing industry, various cleaning operating states or sterilisation states or other states, for example, are also provided.

Particularly in the case of filling machines which are employed in the food processing industry, the product-conveying areas and the aseptic zone, for example, must be sterilised. During this sterilisation, of course no new packages are allowed to be conveyed to the filling unit. Consequently, here the conveying unit and the actuators contained in it, for example, will be inactive and the sterilisation unit and the actuators contained in it will be active. Different actuators, for example valves, regulating valves or drives, which have to work in a synchronised manner, can be contained in a sterilisation unit.

During the cleaning process, it is, for example, not necessary for the sterilisation unit or the actuators contained in it to be active. However, it can be that an actuator is active both during the sterilisation and during the cleaning process and its state has to be altered.

Purely by way of example, the "production" state can contain the production process sequence. This production process can have exclusive access to the actuators 32-42, 46-52. The states of the actuators can be defined as follows: Actuator 34: ON, actuator 38: ON, Sensors 50a, 50b: measurement active, Actuator 46: OPEN, Sensor 48: measurement active, Actuators 52a, 52b: OPEN, Actuator 40: active, Actuator 42: ON.

For the "$H_2O_2$ sterilisation" operating state, the access authorisation can pass to the "sterilisation" process sequence. This process sequence can then have exclusive access to the actuators 32-42, 46-52. The allowed states of the actuators can then be defined as follows: Actuator 34: OUT, actuator 38: OUT, Sensors 50a, 50b: measurement inactive, Actuator 46: CLOSED, Sensor 48: measurement inactive, Actuators 52a, 52b: CLOSED, Actuator 40: active, Actuator 42: ON.

It is apparent that target states of the operating resources can be defined for each process sequence. Each process sequence has exclusive access to one or more operating resources. Various permutations of allowed target states can be stored in state tables dependent on the process sequence.

The invention claimed is:

1. A method for controlling a packaging machine comprising:
    defining at least two operating states of the packaging machine which are independent from one another,
    allocating at least one of a plurality of defined process sequences to each of the operating states and
    actuating at least one operating resource of the packaging machine by a process sequence, in order to carry out at least one action,
    wherein
    an authorization for access to an operating resource is exclusively allocated to one single process sequence using solely a single control device depending on the operating state stored in the control device, and
    wherein at least two operating resources depending on their respective functions or other sort criteria within the packaging machine are allocated to a group, and wherein the exclusive authorization for access to a group is allocated to one process sequence.

2. The method according to claim 1, wherein only the exclusively access authorized process sequence can actuate and/or change a state of an operating resource.

3. The method according to claim 1, wherein with each change between two operating states the authorization for access to an operating resource or a group is checked and as appropriate an authorization for access to an operating resource or a group is assigned to another process sequence.

4. The method according to claim 1, wherein the packaging machine is specifically only in one operating state at each point in time.

5. The method according to claim 1, wherein at least two sub-processes are defined in at least one of the process sequences.

6. The method according to claim 1, wherein in a process sequence or a sub-process, access to at least one of the operating resources is defined via at least one access table.

7. The method according to claim 1, wherein at least one target state is defined for at least one operating resource in an access table.

8. The method according to claim 1, wherein an access table is specifically allocated to a process sequence.

9. The method according to claim 1, wherein target operating resource states of at least two operating resources are described in an access description in an access table.

10. The method according to claim 1, wherein the packaging machine is controlled depending on the operating resource states defined in the access table.

11. The method according to claim 1, wherein an operating state is at least one of the operating states selected from the following group:
power up/start up;
ready for sterilization and/or cleaning;
sterilization;
production;
ready for cleaning;
cleaning (CIP); and
shut down.

12. The method according to claim 1, wherein a process sequence is at least one of the process sequences selected from the following group:
sterilization, in particular H2O2 sterilization;
sterilization during production, in particular H2O2 sterilization during production;
steam sterilization;
production;
chain cleaning;
steam barrier/steam node;
circulation cleaning; and
base process operation.

13. The method according to claim 1, wherein an operating resource is at least one of the operating resources selected from the following group:
control valve;
heater;
compressed air generator;
steam unit;
servomotor;
pump;
ventilator;
sterilizer;
a sensor control system;
logical interconnection; and
import signal and/or export signal.

14. A packaging machine comprising:
a single control device,
a program memory,
plurality of operating resources
wherein the control device solely controls an access by a process sequence stored in the program memory to at least one of the operating resource, and
wherein depending on an operating state the control device exclusively grants to only one of the process sequences an access authorization to an operating resource,
wherein at least two operating resources depending on their respective functions or other sort criteria within the packaging machine are allocated to a group, and wherein the exclusive authorization for access to a group is allocated to one process sequence.

15. The packaging machine according to claim 14, wherein the plurality of operating resources comprise actuators and/or sensors.

* * * * *